Dec. 1, 1936.   R. C. SABINS   2,062,798
HYDRAULIC BRAKE SYSTEM
Filed Feb. 28, 1935
Fig. 1
Fig. 3
Fig. 2
Fig. 4
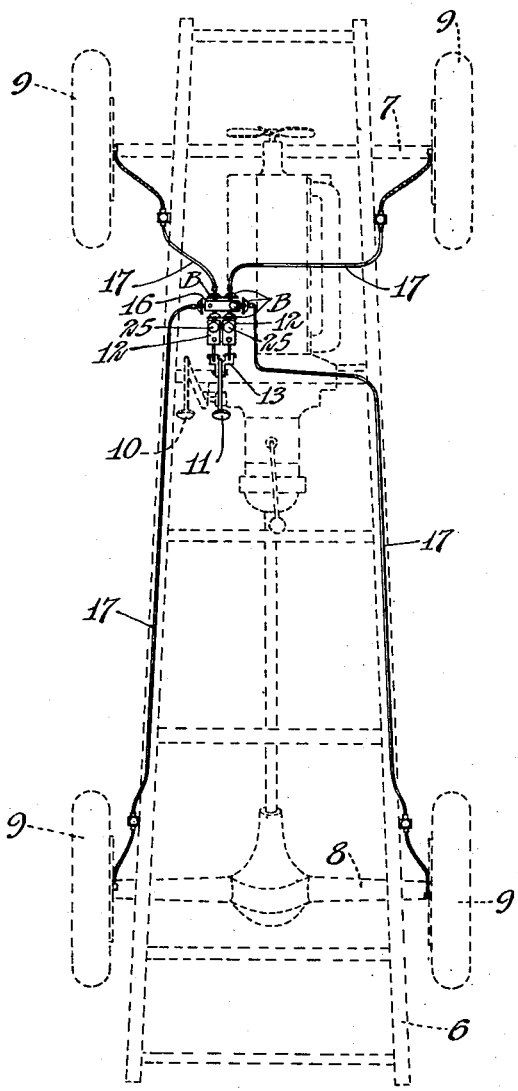
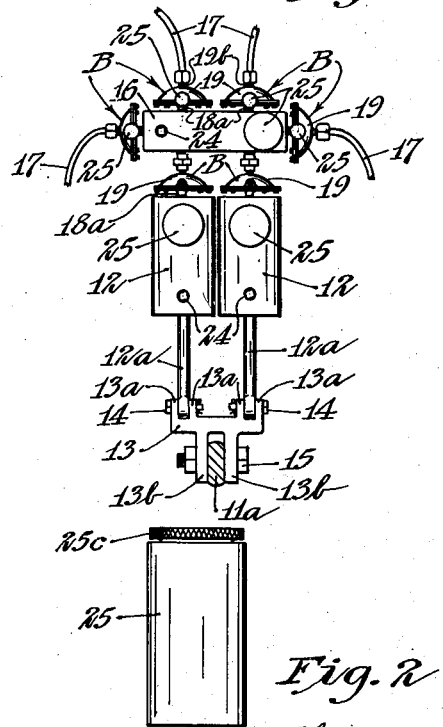
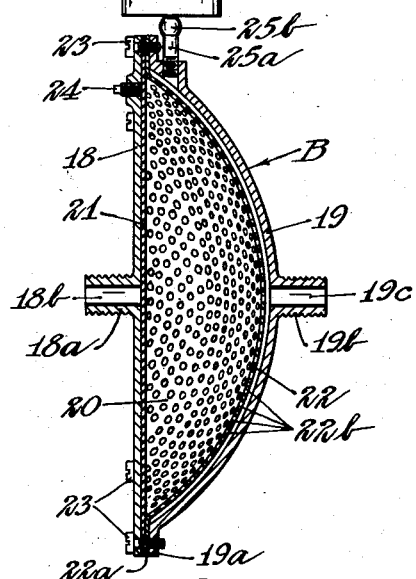
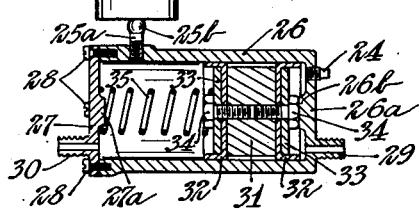
Inventor
Rolland C. Sabins
By his Attorneys
Williamson & Williamson Patented Dec. 1, 1936

2,062,798

UNITED STATES PATENT OFFICE 2,062,798

HYDRAULIC BRAKE SYSTEM

Rolland C. Sabins, St. Paul, Minn., assignor to Mechanical Development Co., St. Paul, Minn., a corporation of Minnesota Application February 28, 1935, Serial No. 8,661

3 Claims. (Cl. 303—84)

My invention relates to automobile hydraulic brake operating systems and particularly to means for sectionalizing such systems to prevent a leak in one portion thereof from rendering the entire system inoperative.

In the usual hydraulic brake system a pedal operated pressure pump or master cylinder forces fluid through a system of tubes to the operating cylinders of the several brakes so as to hydraulically transmit pressure from the brake pedal to the brake shoes. In such a system a leak in any part of the system will prevent the building up of pressure in any part of the system and hence will render the entire system inoperative. Such a possibility creates considerable potential hazard and accordingly is highly undesirable.

A general object of my invention is to provide a hydraulic brake operating system wherein a leak in one portion of the system will not render the entire system inoperative.

A more specific object is to provide a hydraulic brake operating system wherein the respective bodies of fluid in several portions of the system are isolated from each other but wherein displacement of fluid in the portion including the master cylinder will cause displacement of fluid in each of the other portions of the system.

Another object is to provide such a system wherein the bodies of fluid in the portion of the system including the pressure pump and the respective portions serving respective ones of the brake actuating cylinders are all isolated from each other and displacement of fluid in the first mentioned portion will cause displacement in each of the remaining portions within predetermined limits.

A further object is to provide a device in such a system for preventing flow of fluid between respective ones of two bodies of fluid both in communication with said device and yet permitting displacement of the fluid of one body to produce a similar displacement of the fluid of the other body.

These and other objects and advantages of the invention will be more fully set forth in the following description made in connection with the accompanying drawing, in which like reference characters refer to similar parts throughout the several views, and in which:—

Fig. 1 is a top view of an automobile chassis in dotted lines with my system shown therein in full lines;

Fig. 2 is a vertical sectional view of the fluid sectionalizing device of my system;

Fig. 3 is a top view of the master cylinders and manifold of my system, and

Fig. 4 is a vertical sectional view of another form of my fluid sectionalizing device.

Referring to the drawing, my hydraulic brake operating system is shown as applied to an automobile chassis shown in dotted lines in Fig. 1 and including a frame 6, front and rear axles 7 and 8, and wheels 9, all of conventional construction, each of the wheels 9 being equipped with brake drums, brake shoes and hydraulic brake operating cylinder and pistons, all of conventional form and not shown. Clutch and brake pedals 10 and 11 of conventional design are provided.

Whereas only one master cylinder or pressure applying means is customarily used in a hydraulic brake operating system, I employ a pair of such master cylinders 12 suitably mounted in parallel relation to each other forwardly of the brake pedal 11 as shown. The piston rods 12a of the respective master cylinders 12 are connected to lugs 13a on a yoke 13 by means of pins 14 or other suitable means and lugs 13b on the opposite side of the yoke 13 are connected to the arm 11a of the brake pedal 11 by means of a nutted bolt 15 or other suitable means so that forward movement of the brake pedal 11 will cause forward movement of the piston rods 12a to bring about compressive action within both of the cylinders 12.

A chamber or manifold 16 is provided to connect the respective outlets of the two master cylinders 12 together and to the respective conduits or tubes leading to the cylinders of the individual brake actuating mechanisms of the respective wheels 9. The outlet of each of the master cylinders 12 is connected to the manifold 16 through a fluid sectionalizing device B to be described in detail. Other similar sectionalizing devices B are provided to connect the manifold 16 to the respective ones of tubes 17 running to the cylinders of the respective individual brake actuating mechanisms.

Referring particularly to Fig. 2, each of the fluid sectionalizing devices B includes a circular base plate 18 and a dome-shaped body 19 having an annular flange 19a suited for attachment to the annular marginal portion of the plate 18 so that a chamber 20 may be formed between the plate 18 and the body 19. The outer sides of the plate 18 and the body 19 are respectively provided with externally screw-threaded bosses 18a and 19b formed integrally therewith. The bossed portions 18a and 19b of the plate 18 and body 19 are respectively provided with apertures 18b and 19c communicating with the chamber 20 formed between the plate 18 and the body 19 and constitute connection elements by means of which the fluid sectionalizing device B is connected to other portions of the brake operating system. The connection elements 18a and 19b are intended for connection respectively to a source of fluid under pressure and to portions of a brake operating system utilizing fluid under pressure.

The chamber 20 is provided with an element dividing the chamber into two portions between which fluid cannot flow, this element being deflectible within certain limits to permit simultaneous increase in the volume of one of the two portions of the chamber and corresponding decrease in the volume of the other of the two portions. The deflectible element referred to consists of a diaphragm 21 formed of relatively flexible and elastic material such as rubber. The annular marginal portion of the diaphragm 21 is disposed against the inner side of the annular marginal portion of the plate 18 and the normal or non-deflected position of the diaphragm 21 is immediately adjacent and parallel to the inner side of the plate 18 as shown.

A dome-shaped wall or backing element 22 for limiting deflection of the diaphragm 21 is placed within the chamber 20 in slightly spaced parallel relation to the inner side of the body 19. The peripheral portion of the wall 22 is provided with an annular flange 22a disposed between the flange 19a of the body 19 and the annular marginal portion of the diaphragm 21. The annular marginal portions of the plate 18 and diaphragm 21 and the flanges 22a and 19a of the wall 22 and body 19 are all clamped together in sealed relation by means of screws 23 which extend through suitable apertures in the plate 18, diaphragm 21 and flange 22a and are screw-threadedly engaged in suitable internally screw-threaded apertures in the flange 19a of the body 19. The dome-shaped wall is provided with a plurality of small spaced perforations or apertures 22b distributed throughout its area for permitting the flow of fluid from one side to the other of the wall 22. The space between the wall 22 and the body 19 serves as a passage between the various apertures 22b and the aperture 19c of the connection element 19b.

When fluid under pressure is introduced into the fluid sectionalizing device B through the connection element 18a this fluid forces deflection of the diaphragm 21 toward the perforated wall 22 and occupies the portion of the chamber 20 between the plate 18 and the diaphragm 21. Any fluid occupying the portion of the chamber 20 between the diaphragm 21 and the body 19 is placed under pressure and is displaced through the apertures 22b of the wall 22 and the connection element 19b. Thus, while no actual flow of fluid through the device B can take place, pressure applied to a body of fluid on the left side of the diaphragm 21, as viewed in Fig. 2, is transmitted to a body of fluid on the right side of the diaphragm. Due to pressure applied to the first body of fluid, displacement of both bodies of fluid will take place and when the back-pressure in the last mentioned body of fluid has become equal to the pressure applied to the first mentioned body of fluid, such displacement of fluid will cease and the diaphragm 21 will become stationary in a position intermediate between the plate 18 and the perforated wall 22. If little or no back-pressure is built up the diaphragm 21 will continue to deflect until it bears against the perforated wall or backing element 22 whereafter no further displacement of the fluid at the left of the diaphragm can take place. The perforated wall 22 then serves as a backing plate for bracing the diaphragm 21 against the pressure imposed upon the diaphragm 21 by the fluid at the left thereof and thus prevents rupturing of the diaphragm 21. Under normal conditions when the diaphragm 21 deflects only to a position intermediate of the plate 18 and the perforated wall 22, the back pressure on one side of the diaphragm equals the applied pressure on the other side and hence the diaphragm is under no stress tending to rupture the same.

A plurality of the above described fluid sectionalizing devices B are connected in my hydraulic brake operating system as follows. The connection elements 18a of a pair of devices B are connected to the respective outlets of the two master cylinders 12 and the connection elements 19b of these devices B are both connected to the manifold 16. Where four individual wheel brake operating mechanisms are to be operated, as in the illustrated embodiment of the invention, the connection elements 18a of four devices B are all connected to the manifold 16 and the connection elements 19b of these four devices B are respectively connected to four tubes 17 each of which runs to one of the four individual brake operating mechanisms. From the above it should be apparent that my system contains a number of separate bodies of fluid between which there can be no flow of fluid but between which pressure can be transmitted from the master cylinders 12 toward the individual brake operating mechanisms. The respective ones of these bodies of fluid are separated from each other by the diaphragms 21 of the devices B and are located in the respective ones of the master cylinders 12, in the manifold 16 and in the respective ones of the tubes 17 and associated individual brake operating mechanisms.

When the brake pedal 11 is pressed, the bodies of fluid in the two master cylinders 12 are placed under pressure and this pressure is transmitted to the body of fluid in the manifold 16 through the deflectible diaphragms 21 of the devices B which connect the respective master cylinders 12 to the manifold 16. The pressure on the fluid in the manifold 16 is transmitted to the bodies of fluid in the respective tubes 17 through the diaphragms 21 of the devices B which connect the manifold 16 to the respective tubes 17. The fluid in each tube 17 is, of course, in direct communication with the fluid in the cylinder of one of the individual brake operating mechanisms and hence development of pressure in the respective tubes 17 causes application of the respective individual wheel brakes.

The proportions of the devices B should be such that maximum braking effect can be secured when the diaphragm 21 is still some distance away from the perforated wall or backing plate 22.

Should a leak occur in either of the master cylinders 12 pressure developed in the other one of the cylinders 12 cannot drive fluid back from the manifold 16 into the faulty cylinder 12 and hence this pressure is available for operating the brake system. The diaphragm 21 of the device B between the faulty cylinder and the manifold 16 will block back flow of fluid into the faulty cylinder 12 and the diaphragm 21 since it is in its normal position lying against the plate 18, will be restrained by the plate 18 against either deflection or rupture.

Should the cylinder of one of the individual brake operating mechanisms or the tube 17 serving the same become leaky, pressure in the manifold 16 produced by the initial part of a brake applying operation of the master cylinders 12 will force the diaphragm 21 of the device B to which that tube 17 is connected against the perforated backing element of that device B whereupon further deflection of the diaphragm 21 and further displacement of fluid toward the leak will be halted. Since the leak prevents, or at least seriously limits, the building up of back pressure in the tube 17 it should be obvious that only a small part of normal brake operating pressure is required in the manifold 16 to cause the above described action of the diaphragm 21. Continuation of the brake applying operation of the master cylinders 12 will obviously build up pressure in the manifold 16 and all of the tubes 17 and individual brake operating cylinders except the leaky one. Consequently three of the four brakes will be applied even though a leak has occurred in the portion of the system serving one of the brakes.

It should be obvious that the automatic brake equalizing characteristic inherent in conventional hydraulic brake operating systems is also inherent in my hydraulic brake operating system.

As in conventional hydraulic brake operating systems, air bleeder plugs 24 and fluid replenishing reservoirs 25 of conventional design are placed at suitable points in my system. An air bleeder plug 24 is screwed into a suitable internally screw-threaded apertured portion of the upper part of the plate 18 of each of the devices. A fluid replenishing reservoir 25, having a suitable connection stem 25a, is mounted on each device B by means of the screw-threaded lower end of the stem 25a which is engaged in an internally screw-threaded apertured portion of the upper part of the body 19. In an enlarged portion 25b of the stem 25a a check valve is provided to permit downward flow of fluid from the reservoir 25 when no pressure exists in the system and to prevent upward movement of fluid when pressure exists in the system. The upper end of the reservoir is normally closed by a screw threaded filler cap 25c. While bleeder plugs 24 and replenishing reservoirs 25 are shown applied to the devices B, the master cylinders 12 and the manifold 16 it should be understood that such elements may be placed at all points in the system corresponding to the highest levels of the respective several separate bodies of fluid.

It should be apparent that, if desired, a single master cylinder 12 may be used in conjunction with the manifold 16 and the devices B associated with the respective tubes 17. Also the number of devices B associated with the tubes 17 may be reduced to two and two tubes 17 may be connected to each of these devices B. The devices B associated with a tube 17 may of course be used to connect together sections of that tube 17 instead of being connected between the tube 17 and the manifold 16.

Various embodiments of the inventive idea of my fluid sectionalizing device B may be constructed and one such embodiment is shown in Fig. 4. This embodiment includes a cylinder 26 having an integral cylinder head 26a closing one end thereof and a removable cylinder head 27 closing the other end thereof and secured to the cylinder 26 by means of screws 28. The cylinder heads 26a and 27 are respectively provided with outwardly projecting connection elements 29 and 30 each communicating with the interior of the cylinder 26. Within the cylinder is a piston 31 having flanged sealing elements 32 secured to the respective ends thereof by means of washers 33 and screws 34 and with the flanges of the sealing elements 32 projecting outwardly of the ends of the piston 31. The heads of the respective screws 34 comprise abutment elements and for cooperation therewith the inner sides of the cylinder heads 26a and 27 are respectively provided with centrally located inwardly projecting integral bosses 26b and 27a. A helical compression spring 35 is interposed between the piston 31 and the removable cylinder head 27 and the end turns at the respective ends of the spring 35 encircle and are held in position by the head of one of the bolts 34 and the boss 27a. A bleeder plug 24 is provided in the upper portion of the cylinder head 26a and a replenishing reservoir 25, such as previously described, is provided at the upper side of the cylinder 26. This embodiment of my fluid sectionalizing device may be used in a hydraulic brake operating system in the same manner as the first described device B. The connection element 29 is connected to a source of fluid under pressure and the connection element 30 is connected to means for utilizing fluid under pressure so that pressure will be transmitted through the device from right to left as viewed in Fig. 4.

While my hydraulic brake operating system has been illustrated and described as applied to the brakes of an automobile it should be understood that my system is readily applicable to any vehicle having two or more brake-equipped wheels.

It is apparent that I have invented a novel, efficient, simple and reliable hydraulic brake operating system wherein leakage of fluid in one portion of the system does not render the entire system inoperative.

It will, of course, be understood that various changes may be made in the form, details, proportions and arrangement of the parts without departing from the scope of my invention, which, generally stated, consists in a device capable of carrying out the objects above set forth and in the novel parts and combinations of parts disclosed and defined in the appended claims.

What is claimed is:—

1. Fluid sectionalizing means for a hydraulic brake operating system comprising a chamber, a fluid-tight diaphragm mounted within said chamber to divide said chamber into two portions, one of said portions having communication with the fluid pressure exerting means of said system and the other of said portions having communication with a fluid pressure actuated brake operating means of said system, and a backing member mounted in said chamber for said diaphragm to lie against when said diaphragm has been deflected to a predetermined degree by pressure exerted by said pressure exerting means.

2. The structure defined in claim 1 and said backing member being concave on the side thereof receiving said diaphragm.

3. The structure defined in claim 1 and said backing member comprising a wall having a concave shape on the side thereof receiving said diaphragm and being provided with perforations.

ROLLAND C. SABINS.